United States Patent [19]

Gossett et al.

[11] 3,963,612

[45] *June 15, 1976

[54] SYSTEM OF WATER PURIFICATION AND PRODUCT DISTRIBUTION

[76] Inventors: Charles W. Gossett, 14025 Crenshaw Blvd., Hawthorne, Calif. 90250; William J. Dauenhauer, P.O. Box 487, Gualala, Calif. 95445

[ * ] Notice: The portion of the term of this patent subsequent to Aug. 27, 1991, has been disclaimed.

[22] Filed: Sept. 16, 1974

[21] Appl. No.: 506,739

[52] U.S. Cl. ............................ 210/143; 210/257 R; 210/321 R
[51] Int. Cl.² ................... B01D 13/00; B01D 31/00
[58] Field of Search .................... 210/143, 257, 321

[56] References Cited
UNITED STATES PATENTS

| | | | |
|---|---|---|---|
| 3,630,378 | 12/1971 | Bauman | 210/257 |
| 3,679,055 | 7/1972 | Clark et al. | 210/257 |
| 3,726,793 | 4/1973 | Bray | 210/321 |
| 3,746,640 | 7/1973 | Bray | 210/321 |
| 3,747,763 | 7/1973 | Kam | 210/321 |
| 3,794,172 | 2/1974 | Bray | 210/321 |
| 3,831,757 | 8/1974 | Gossett et al. | 210/257 |

*Primary Examiner*—Theodore A. Granger

[57] ABSTRACT

A system of repetitively replenishing a reserve supply in a reservoir of nearly pure product water discharged from a reverse osmosis module that is mounted for reciprocation, the input of which is connected to a conventional water service line and the output of which is in communication with said reservoir and with a valve-controlled product dispensing line; the supply of water from said water service line being controlled by the reciprocation of the module.

5 Claims, 7 Drawing Figures

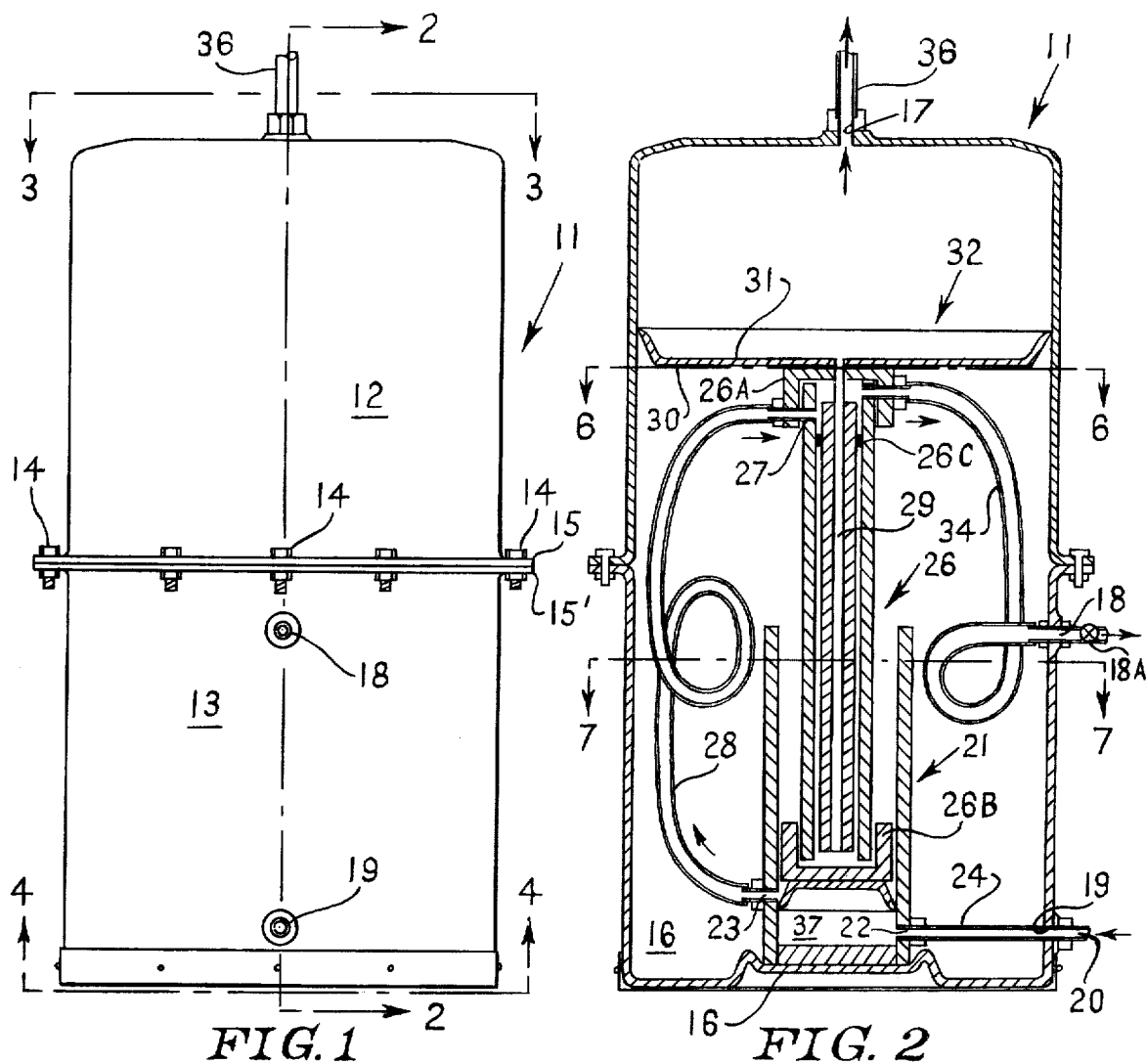
FIG. 1
FIG. 2
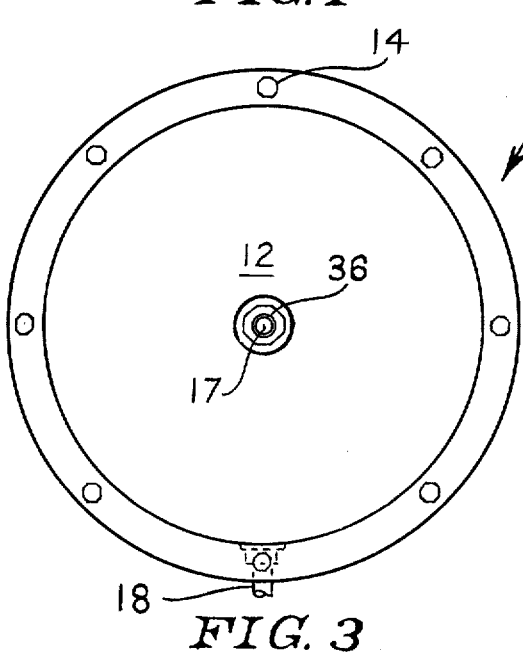
FIG. 3
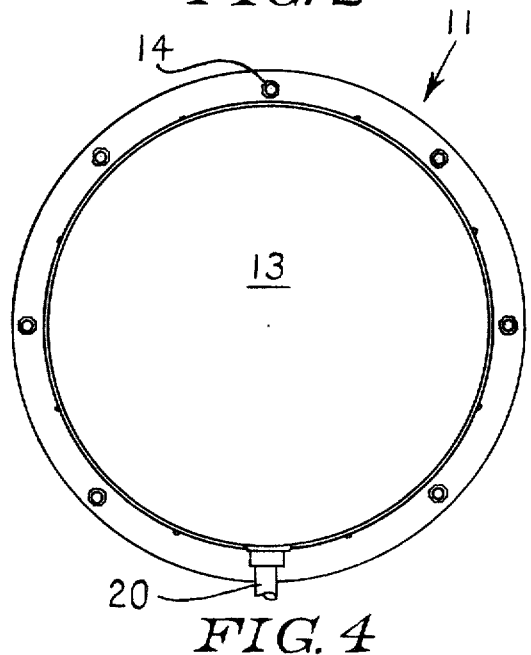
FIG. 4

SYSTEM OF WATER PURIFICATION AND PRODUCT DISTRIBUTION

The present invention is a modification of our prior invention in a system of the same general nature which is described, illustrated and claimed in U.S. Pat. No. 3831757, entitled WATER PURIFYING AND DISTRIBUTING SYSTEM, issued to us on Aug. 27, 1974.

A primary object of our improvement is to provide a system of water purification and product distribution wherein a reverse osmosis module of the system is movably mounted for controlling the supply thereto of water to be purified.

Another important object of our present invention is to provide a system of water purification and distribution which employs a movably mounted reverse osmosis module that moves in response to the hydraulic pressure differential created on opposite sides thereof during the operation of the system.

A still further object of our invention is to provide a system of water purification and product water distribution of the indicated nature which is additionally characterized by the confinement of the principal components thus eliminating the likelihood of damage and deterioration by exposure to the adverse action of the elements of nature.

Another object of the invention is to provide a system of water purification and product water distribution of the aforementioned character which is especially devised for home use; which is assembled and operable with a minimum of parts; and which can be dissembled for replacement of components with facility by the unskilled.

Other objects of the invention, together with some of the advantageous features thereof, will appear from the following description of the embodiment of our invention illustrated in the accompanying drawings which exemplify the best mode of construction of the invention and the manner of using the same. It is to be understood that the appended claims are intended to cover the illustrated embodiments as well as modifications thereof within the scope and purview of the invention.

Referring to the drawings:

FIG. 1 is a side elevational view of the exterior of a preferred embodiment of our invention, this view omitting water service supply line and drain line.

FIG. 2 is a sectional elevational view taken on the line 2—2 of FIG. 1 and showing the reservoir full of product water.

FIG. 3 is a top plan view of the vessel of the system, this view being taken on the line 3—3 of FIG. 1.

FIG. 4 is a bottom plan view of the vessel of the system taken on the line 4—4 of FIG. 1.

Figure 5:
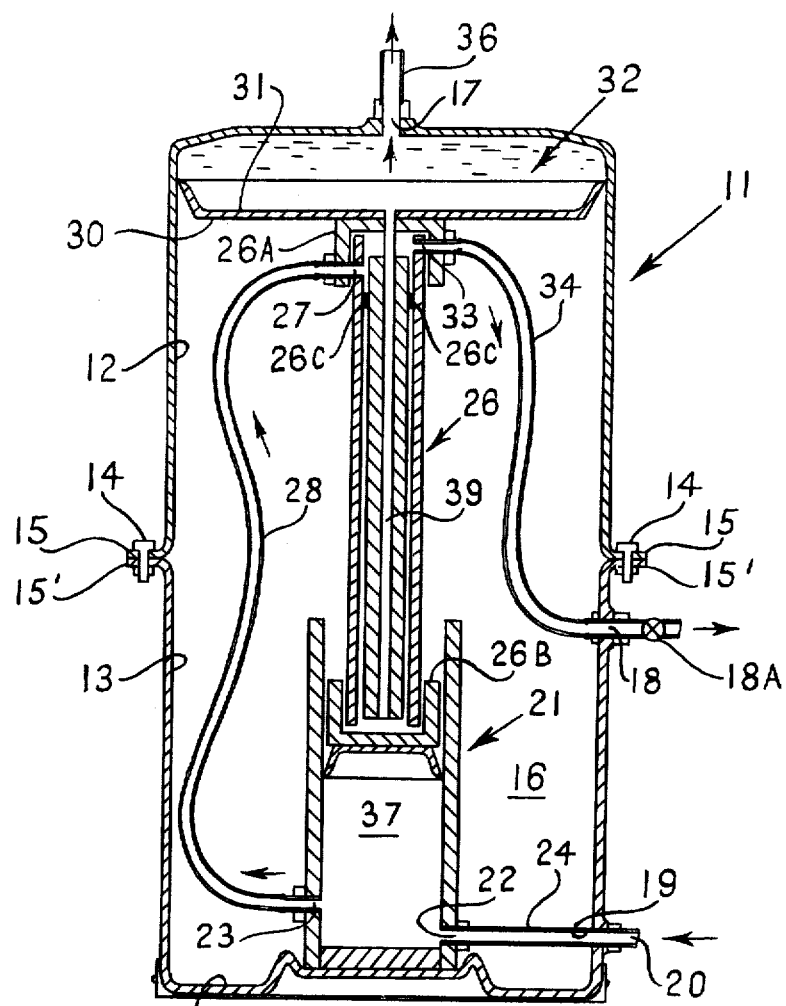
FIG. 5 is a sectional elevational view of the preferred embodiment of our present invention; this view being similar to FIG. 2 but showing the movably mounted reverse osmosis module of the system in one of its positions and with the associated reservoir nearly empty.
Figure 6:
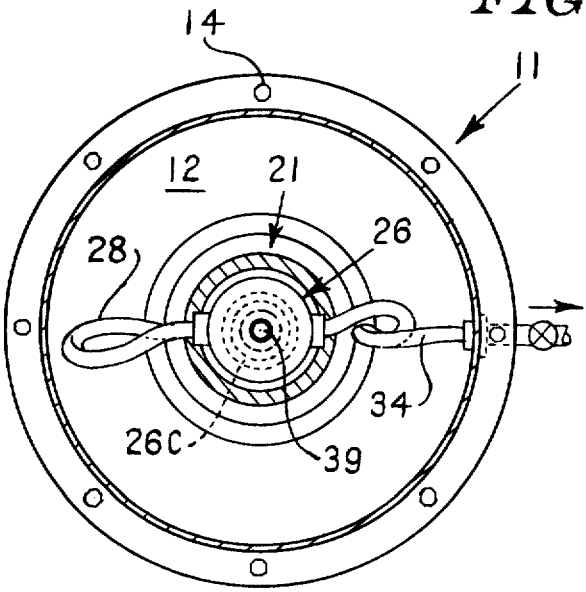
FIG. 6 is a view of the preferred embodiment taken on the line 6—6 of FIG. 2 and illustrating the water supply and drain connections with the reverse osmosis module and the sealing diaphragm adjacent the top of the module.
Figure 7:
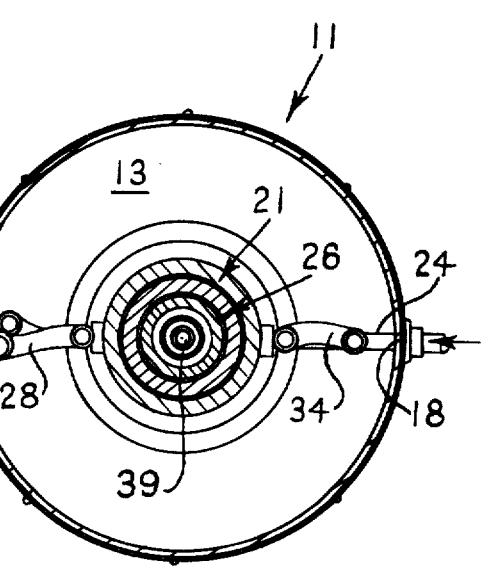
FIG. 7 is a view taken on the line 7—7 of FIG. 2 showing the lower portion of the module and the supply and drain connections.

In its best mode of construction as illustrated in the accompanying drawings, our present invention comprises a vessel having a relatively large interior chamber for housing the principal components of our system; said vessel having an inlet in communication with a conventional water service line as well as an outlet for discharging nearly pure product water, a stationary upright cylinder secured to the bottom of the vessel within said chamber, together with a reciprocable reverse osmosis module within said cylinder and movable in response to the hydraulic differential pressure on opposite sides thereof for controlling the supply of raw water from said water service line into said module, a cup reservoir in communication with the outlet of said reverse osmosis module for holding a replenishable supply of nearly pure product water from said module, and a valve-controlled product water distribution line in communication with said reservoir.

As particularly illustrated in FIGS. 1 and 2 of the annexed drawings, we provide a generally cylindrical hollow vessel 11 which conveniently is manufactured in two sections 12 and 13 detachably connected together by suitable studs or bolts 14 at spaced intervals circumferentially about the sections, and extending through annular flanges 15 and 15' projecting laterally. Preferably we manufacture the sections 12 and 13 from a relatively heavy thick metal, such as 16 guage steel which may be coated with an epoxy resin for sealing the vessel against leakage, Or, if desired, the vessel 11 can be fabricated by molding sections 12 and 13 separately in male and female molds by the so called rotational molding process utilizing a relatively strong, durable plastic resinous material, such as acro-buta dienestyrene resin for the thick walls of the vessel inclusive of top and bottom thereof. This rotational molding process is not per se a part of this invention and is not claimed as such by us. In this process, the resin is reduced to a pouring liquid state and then poured into the female mold of the two part mold, which is then revolved in all directions with controlled heat so as to distribute the resin to the prescribed thickness. Upon completion of the rotational movement, the cool shaped upper and lower sections 12 and 13 are removed from the molds and placed in suitable jigs, not shown, to receive the various components as hereinafter explained, in assembled operable arrangement within the relatively large interior chamber 16 defined by the two sections when detachably connected together by the studs 14.

During the manufacture of the sections 12 and 13 of vessel 11, or thereafter, they are fashioned with a centrally located opening or outlet 17 in the top of upper section 12 as well as with a outlet 18 and an inlet opening 19 in the section 13 thereof. As indicated schematically by the reference numeral 18A, a metering valve is provided in the reject water line 18B and mounted on the sink drain connection, not shown, to create a back pressure for operations as hereinafter explained. The vessel inlet 19 is placed in communication by means of a standard pipe connection 20 with a conventional water service line for supplying raw water to be purified.

In accordance with our present invention, we fixedly secure to the bottom of vessel 11, within chamber 16 thereof an upright cylinder 21 having an inlet port 22 and an outlet port 23 above inlet port 22; the inlet port of the cylinder being in communication with the water service line through a fixed conduit 24. A standard reverse osmosis module, designated generally by the reference numeral 26, is movably mounted within cylinder 21 and is reciprocable in response to the hydraulic differential pressure on opposite sides thereof created during the operation of the system. An inverted small cup 26A having a central opening therein caps the module 26 and an upright small cup 26B encases the bottom of the module 26, as illustrated in FIGS. 2 and 5 of the drawings. The module 26 is fashioned with an inlet 27 in a side wall thereof for receiving raw water flowing through a flexible conduit 28 establishing communication with module inlet 27 as well as communication with the cylinder outlet 23. The standard reverse osmosis module 26 includes a perforated cellulose acetate film or membrane 26C disposed within the module and supported adjacent the inlet 27 thereof. As in the case of all standard reverse osmosis modules the membrane 26C which not only directs flow of raw water into the module but functions to separate out impurities from the supplied raw water that is fed into the module, rejects such impurities with a portion of the raw water to be discharged as concentrates through the drain outlet 18 of vessel 11.

In order to remove the nearly pure water from the module 26 after the impurities have been largely taken out of the supplied raw water, we provide a tube 29 which conveniently is integral with or secured to a centrally aperture plate 30 that we secure to the inside of the wall of section 12 of vessel 11. Any suitable means can be employed to fasten the plate in position, such as providing an annular depending flange 30A on the plate and weld, cement or otherwise secure the same to the section 12. Supported upon plate 30 is a product water cup reservoir having its bottom 31 seated on plate 30 and its wall defining the cup reservoir 32 for holding an appreciable supply of product water delivered from the reverse osmosis module 26 which continually replenishes the supply of pure water to the cup as it is depleted. For enabling flow of wastes from the module, we provide a drain outlet therein together with a flexible conduit 34 which establishes communication between the module 26 and drain outlet 18 of the vessel as well as to the valve-controlled and metered drain connection 18A outside of the vessel.

In FIG. 2 of the annexed drawings, we have shown a product water distribution line 36 connected to the top of the vessel 11 and in communication with the cup reservoir 32 through outlet 17 of the vessel 11. A suitable faucet, not shown, is provided for controlling the flow and dispensing of the nearly pure product water; opening of such faucet permitting the taking off through the dispensing line 36 as much of the nearly pure water as desired. Shutting off or closing of the faucet, of course, stops the flow. As water is drawn from the cup reservoir the reciprocable module 26 rises in cylinder 21 thus expanding or enlarging a compartment 37 which is open both to the inlet port 22 of the cylinder and to the outlet 23 thereof, so as to create a larger and larger head or volume of raw water in compartment 37 as well as in flexible conduit 28 leading to the module inlet 27. The hydraulic pressure differential between the cup reservoir and the compartment 37 of the cylinder 21 together with the back pressure from the drain passage 34 causes the module 26 gradually to reciprocate or move back into the cylinder 21 until it reaches a position where its lower cup closure 26B closes the outlet port 23 of cylinder 21 to shut off flow of raw water from the water service line 20, at the same time replenishing the supply of nearly pure water in cup reservoir 32. This cycle is repeated again and again as the faucet in dispensing line 36 is opened and closed. Of course, an additional faucet or additional faucets, all not shown, can be connected into product water distribution line 36, as desired, for taking off product water flowing therein, as indicated by the arrows 36A.

Inasmuch as our present improvement is assembled in a compact form with the reverse osmosis module 26 accomplishing the dual function of generating on producing nearly pure product water and of controlling the supply of raw water fed to it from the conventional water service line, it seems clear that the assembly and system is ideal for home use, urban or rural, and that the system can be installed in a compact or small space, such as under a sink where space is usually available. The module 26 can readily be replaced whenever necessary by simply unfastening the bolts 14 and taking the sections 12 and 13 of the vessel 11 apart with the vessel itself and section 13 remaining in an upright position with its bottom resting on a planar surface, such as a level floor.

We preferably manufacture our present improvement to such dimensions as to provide an hydraulic pressure differential of 10 to 1 between the compartment 37 of cylinder 21 and the cup reservoir 32 within vessel 11 thereby to effect a downward movement of the reverse osmosis module 26 with a minute differential psi. Product water will produce until the pressure in the reservoir 32 reaches a static psi with the pressure in compartment 37. The pressure per square inch in reservoir 32 is one-tenth of the pressure in compartment 37 since outlet port 23 of cylinder 21 closes when the reservoir 32 is full. At that time product water starts back flowing through tube 29 through the module and out of drain outlet 18 through conduit 34 to drain, thereby causing automatic back pressure and flushing continually while reservoir 32 is full. The metering valve 18A is conventional and is not, oof course our invention per se; the setting of such valve being within the skill of the ordinary artisan for controlling flow of waste or separated out impurities to drain.

We claim:

1. A system of water purification and product distribution comprising, in combination with a water service line, a hollow vessel having an inlet communicating with said water service line and also having a pair of outlets including a product outlet and a drain outlet, a cylinder fixedly secured within said vessel; said cylinder having an inlet port communicating with the inlet of said vessel and also having an outlet port, a reservoir supported within said vessel and in communication with said product outlet of said vessel, a reverse osmosis module mounted for reciprocation within said cylinder; said module having an inlet in communication with said water service line through said outlet port of said cylinder and also having a pair of outlets including a product outlet in communication with said reservoir and a drain outlet for repetitively delivering nearly pure product water through said product outlet thereof to said reservoir and for delivering separated out impurities through said drain outlet thereof to said drain outlet of said vessel, upon the downward movement of said module into said cylinder to close said outlet port of said cylinder and thereby shut off supply of raw water from said water supply line, a valve controlled drain line establishing communication between said drain outlet of said vessel and said drain outlet of said module for creating back pressure therein, and a valve-controlled product dispensing line in communication with said reservoir through said product outlet of said vessel,; depletion of the supply of nearly pure product water in said reservoir by opening said dispensing line reducing the hydraulic pressure above said module and increasing hydraulic pressure below the same to effect upward movement of said outlet port of said cylinder to open said outlet port of said cylinder and said inlet of said module thereby causing flow of raw water into said module and the refilling of said reservoir with nearly pure product water from said module.

2. A system of water purification and product distribution as set forth in claim 1, wherein said inlet port of said vessel is always open and wherein said outlet port of said cylinder is controlled by the reciprocation of said module.

3. A system of water purification and product distribution as set forth in claim 1 wherein the hydraulic pressure differential between said cylinder and said reservoir is established at a ratio of 10 to 1, and said reverse osmosis module moves under minute psi.

4. A system of water purification and product distribution as set forth in claim 1, wherein a head of raw water from said water service line is constantly maintained between said inlet port of said cylinder and said outlet port of said cylinder when said reservoir is full.

5. A system of water purification and product distribution as set forth in claim 1, wherein a head of raw water from said water service line is constantly maintained between said inlet port of said cylinder and said inlet of said module when said reservoir is nearly empty.

* * * * *